(12) United States Patent
Fierle et al.

(10) Patent No.: US 6,598,664 B2
(45) Date of Patent: Jul. 29, 2003

(54) BYPASS SEAL FOR AIR PREHEATERS

(75) Inventors: Kurt M. Fierle, Wellsville, NY (US); Robin B. Rhodes, Wellsville, NY (US); Charles R. White, Wellsville, NY (US)

(73) Assignee: Alstom (Switzerland) Ltd, Baden (CH)

( * ) Notice: Subject to any disclaimer, the term of this patent is extended or adjusted under 35 U.S.C. 154(b) by 35 days.

(21) Appl. No.: 09/769,553

(22) Filed: Jan. 25, 2001

(65) Prior Publication Data

US 2002/0096310 A1 Jul. 25, 2002

(51) Int. Cl.[7] .............................................. F23L 15/02
(52) U.S. Cl. ............................ 165/9; 165/8; 277/370; 277/922; 277/549
(58) Field of Search .................. 165/8, 9, 10; 277/370, 277/365, 375, 419, 922, 549, 550

(56) References Cited

U.S. PATENT DOCUMENTS

| 2,517,512 | A | | 8/1950 | Tigges et al. | |
|---|---|---|---|---|---|
| 4,044,822 | A | * | 8/1977 | Stockman | 165/9 |
| 4,997,028 | A | | 3/1991 | Townsend | 165/9 |
| 5,363,903 | A | | 11/1994 | Hagar | 165/9 |
| 5,363,906 | A | * | 11/1994 | Borowy | 165/9 |
| 5,540,274 | A | * | 7/1996 | Slocum et al. | 165/9 |
| 5,655,594 | A | * | 8/1997 | Wonderling | 165/9 |
| 5,697,619 | A | * | 12/1997 | Fierle | 165/9 |
| 5,836,378 | A | * | 11/1998 | Brophy et al. | 165/9 |
| 5,881,799 | A | * | 3/1999 | Kozacka et al. | 165/9 |
| 5,913,359 | A | * | 6/1999 | Milligan et al. | 165/9 |
| 5,950,707 | A | * | 9/1999 | Kozacka et al. | 165/9 |

* cited by examiner

Primary Examiner—Christopher Atkinson
(74) Attorney, Agent, or Firm—Russell W. Warnock

(57) ABSTRACT

A bypass seal for a rotary regenerative air preheater includes primary and secondary seal leaves that are joined at a single position longitudinally intermediate their first and second sends. The first end portion of the primary seal leaf extends longitudinally beyond the first end of the secondary seal leaf and the second end portion of the secondary seal leaf extends longitudinally beyond the second end of the primary seal leaf. When installed in the air preheater, the first end portion of the primary seal leaf of each bypass seal in one of the seal rings overlaps the second end portion of the secondary seal leaf of an adjacent bypass seal in the seal ring.

19 Claims, 6 Drawing Sheets

BYPASS SEAL FOR AIR PREHEATERS

BACKGROUND OF THE INVENTION

The present invention relates to rotary regenerative air preheater and more particularly to bypass seals for rotary regenerative air preheaters.

A rotary regenerative air preheater transfers sensible heat from the flue gas leaving a boiler to the entering combustion air through regenerative heat transfer surface in a rotor which turns continuously through the gas and air streams. The rotor is supported in a housing and is divided into compartments by a number of radially extending plates referred to as diaphragms. These compartments are adapted to hold modular baskets in which the heat transfer surface is contained. In the normal arrangement, circumferential bypass seals are provided between the rotor and the housing to prevent the air and gas from flowing around the outside of the rotor.

In conventional air preheaters, the bypass seals have two, separate, overlapping leaves, a base leaf and a second, overlapping leaf which covers leakage paths through the base leaf. Each of the leaves is typically thirty six (36) inches long and there is fifty percent (50%) overlap between the leaves, providing a combined bypass seal length of fifty four (54) inches. The bypass seals are installed in the field, requiring the installer to hold the two seal leaves in place during the installation process.

SUMMARY OF THE INVENTION

The present invention involves an improved design of bypass seals for a rotary regenerative air preheater. The invention involves the use of primary and secondary seal leaves that are joined at a single position longitudinally intermediate their first and second ends to form a bypass seal. The first end portion of the primary seal leaf extends longitudinally beyond the first end of the secondary seal leaf and the second end portion of the secondary seal leaf extends longitudinally beyond the second end of the primary seal leaf such that the first end of the primary seal leaf defines the first end of the bypass seal and the second end of the secondary seal leaf defines the second end of the bypass seal. When installed in the air preheater, the first end portion of the primary seal leaf of each bypass seal in one of the seal rings overlaps the second end portion of the secondary seal leaf of an adjacent bypass seal in the seal ring.

Each of the seal leaves includes a base portion and a sealing portion extending from the base portion to a sealing edge. The sealing portion has a plurality of tabs separated by equidistantly spaced slots extending laterally from the sealing edge. The slots provide additional flexibility to the bypass seal and facilitate bending the bypass seal into an arcuate form during installation. One of the tabs of each seal leaf overlaps each of the slots of the other seal leaf to prevent leakage through the slot.

The base portions of each of the seal leaves define a plurality of complimentary equidistantly, longitudinally spaced mounting slots. The first of the mounting slots is positioned at a distance $D_1$ from the first end of the bypass seal and the last of the mounting slots is positioned at the distance $D_1$ from the second end of the bypass seal. The first mounting slot of the primary seal leaf is positioned at the distance $D_1$ from the first end of the primary seal leaf, the last mounting slot of the primary seal leaf is positioned at a distance $D_2$ from the second end of the primary seal leaf, the first mounting slot of the secondary seal leaf is positioned at a distance $D_2$ from the first end of the secondary seal leaf, and the last mounting slot of the secondary seal leaf is positioned at the distance $D_1$ from the second end of the secondary seal leaf, where $D_2 > D_1$.

DESCRIPTION OF THE PREFERRED EMBODIMENT

Figure 1:
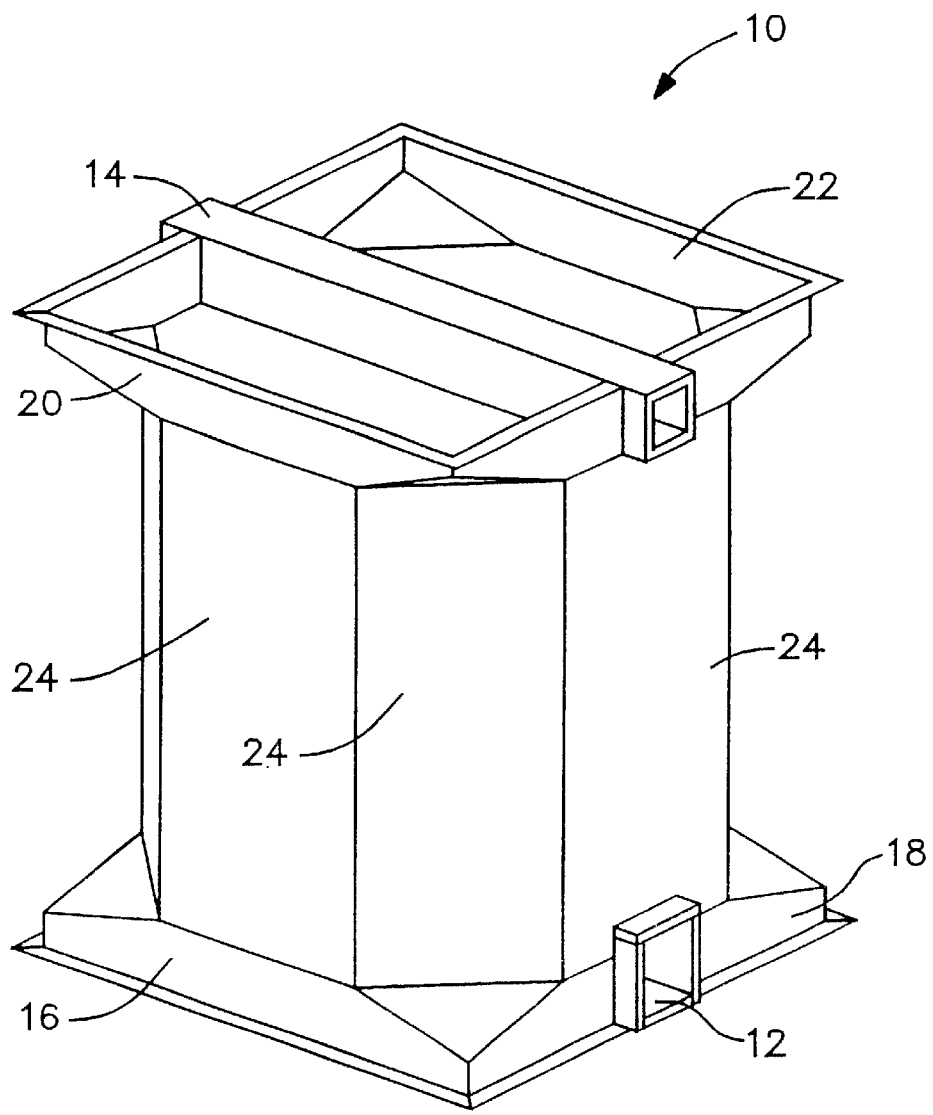
FIG. 1 is a general perspective view of a rotary regenerative air preheater.

FIG. 1 of the drawings is a perspective view of a rotary regenerative air preheater 10 of the type to which the present invention applies. Forming the base of the unit is the cold end center section 12 which is constructed in the conventional manner known in the art and comprises structural steel support beams and the associated support members (not shown in detail) to form the support frame. The rotor of the air preheater (not shown in FIG. 1) is rotatably supported on this cold end center section 12. The upper end of the rotor is supported by the hot end center section 14.

Mounted on the sides of the cold end center section 12 are the cold end connecting plate duct assemblies 16 and 18. These form the connections and the transition between the duct work of the steam generator and the generally circular housing 24 of the air preheater. Mounted on the sides of the hot end center section 14 are the hot end connecting plate duct assemblies 20 and 22. Like the cold end connecting plate duct assemblies 16 and 18, these form the connections and transition between the duct work and the air preheater housing 24. Attached to and extending between the hot and cold connecting plate duct assemblies is the rotor housing 24.

Figure 2:
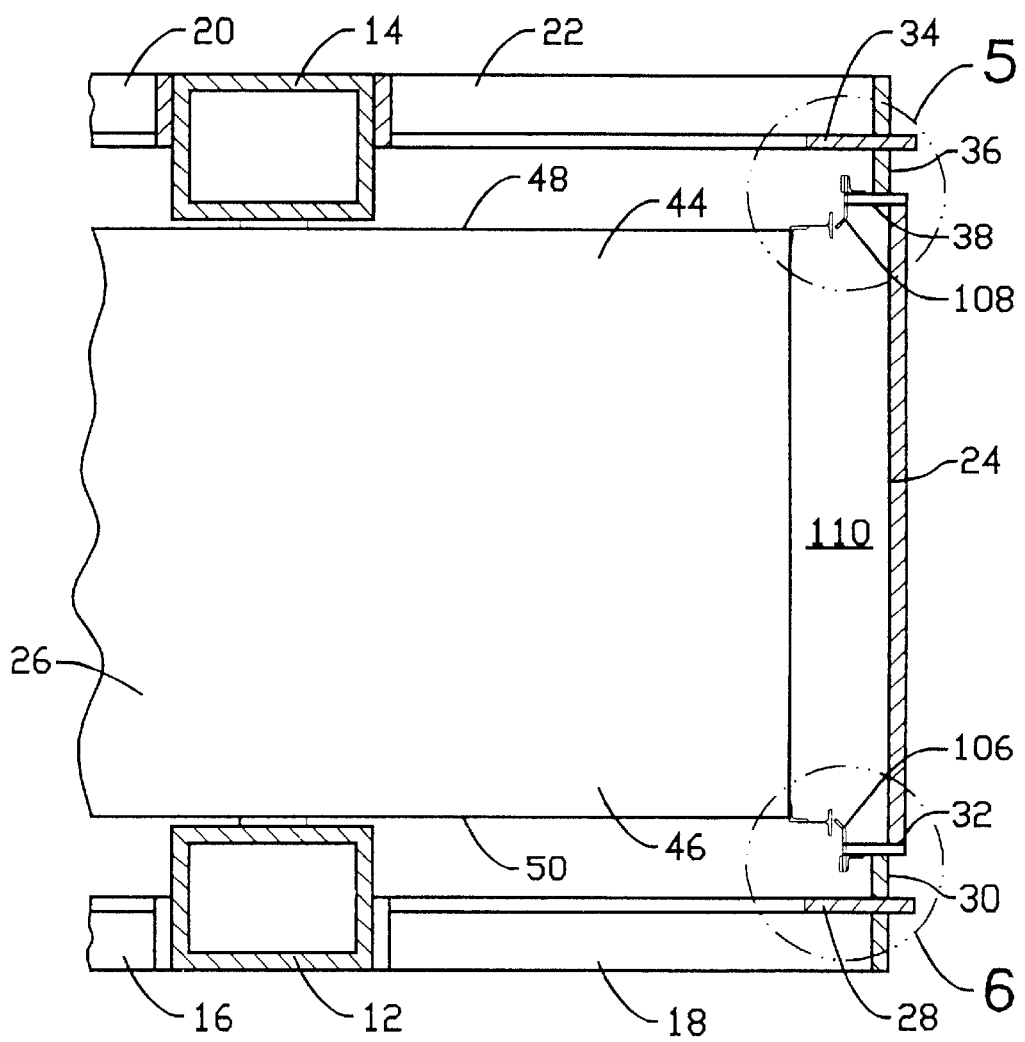
FIG. 2 is a cross-section side view of a portion of a rotary regenerative air preheater illustrating the bypass seals of the present invention.

With reference to FIG. 2, the cold end center section 12 and the hot end center section 14 are shown in cross-section in a simplified form, excluding all the internal structural details. Attached to the sides of the cold end center section 12 are the cold end connecting plate duct assemblies 16 and 18 and the hot end connecting plate duct assemblies 20 and 22 are attached to the sides of the hot end center section 14. The rotor 26 is rotatably mounted between the cold and hot end center sections.

FIG. 2 illustrates the rotor housing arrangement wherein the housing 24 rests on the horizontal housing support flange 28 which is installed around the periphery of the cold end connecting plate duct assemblies 16 and 18. Mounted to the flange 28 are a series of vertical alignment bars 30 which extend upwardly from the flange 28 all around the periphery. The housing 24 and the alignment bars 30 are welded to a cold end circumferential connecting plate flange 32. The hot end connecting duct assemblies 20 and 22 also have a horizontal flange plate 34 around the periphery similar to flange 28. The alignment bars 36 are welded to and extend downwardly from this flange 34. The upper end of the housing 24 and these alignment bars 34 are mounted to the hot end connecting plate flange 38.

Figure 5:
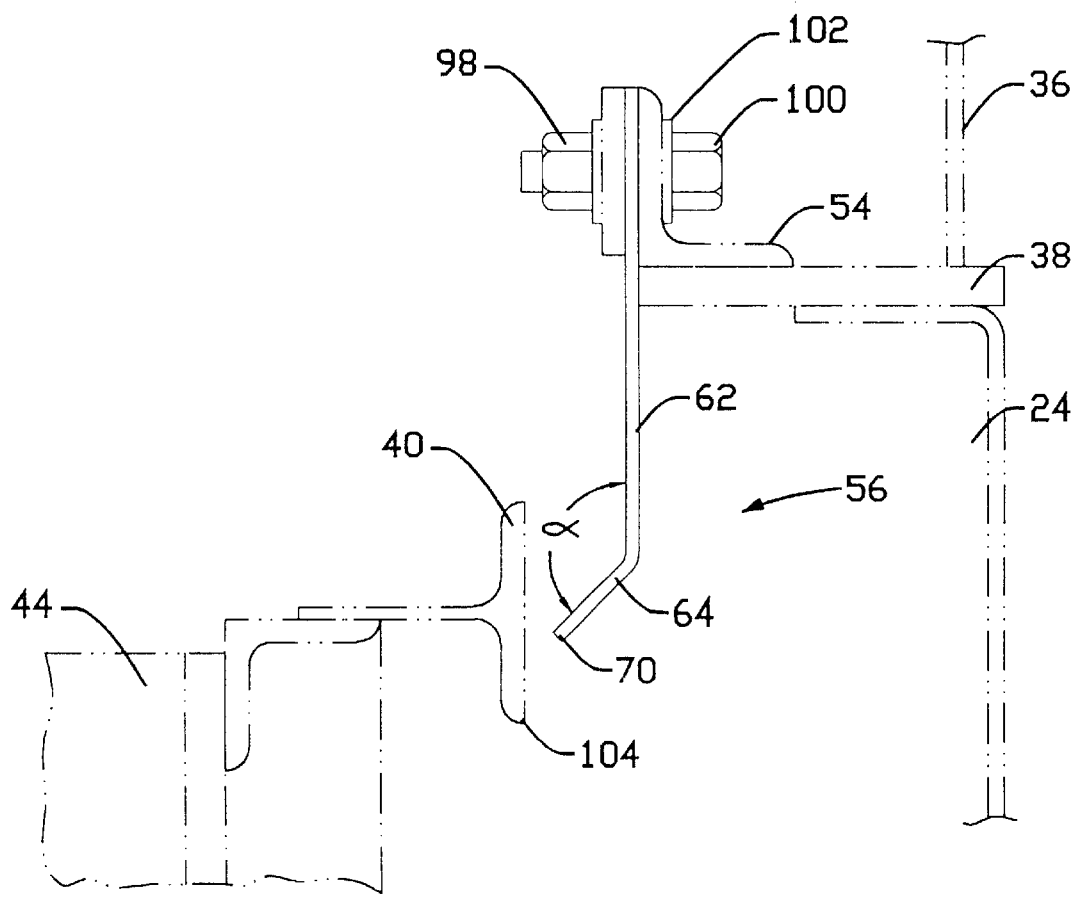
FIG. 5 is an enlarged and more detailed view of Area 5 of FIG. 2.
Figure 6:
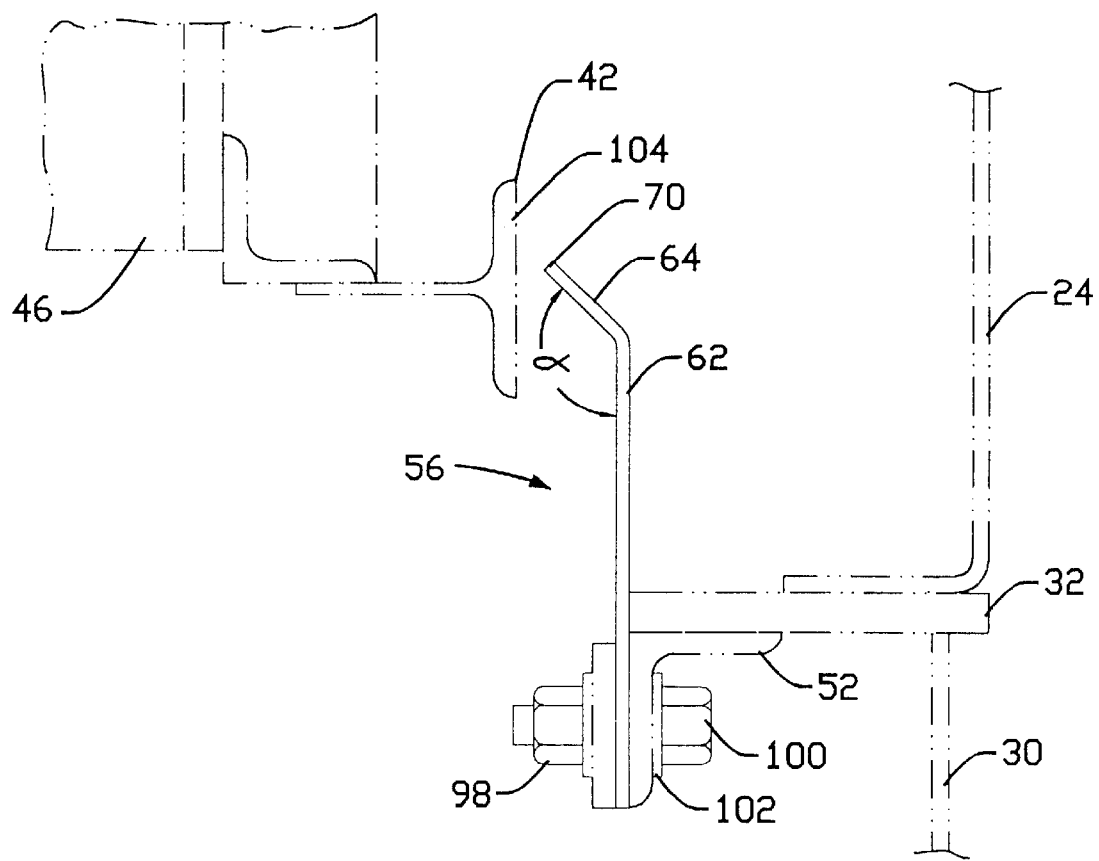
FIG. 6 is an enlarged and more detailed view of Area 6 of FIG. 2.

With reference to FIGS. 2, 5, and 6, annular "T-bar" sealing members 40, 42 are attached around the periphery of the top and bottom end portions 44, 46 of the rotor 26. Extending inwardly from the inside of the housing 24, generally near both the top and bottom ends 48, 50 of the rotor 26, are the connecting plate flanges 32, 38 which each form a generally annular-shaped flange all around the rotor 26. Attached to the flanges 32, 38 are the bypass seal brackets 52, 54 which likewise collectively extend all the way around the rotor 26. Attached to the brackets 52, 54 are the actual bypass seals 56.

Figure 3:
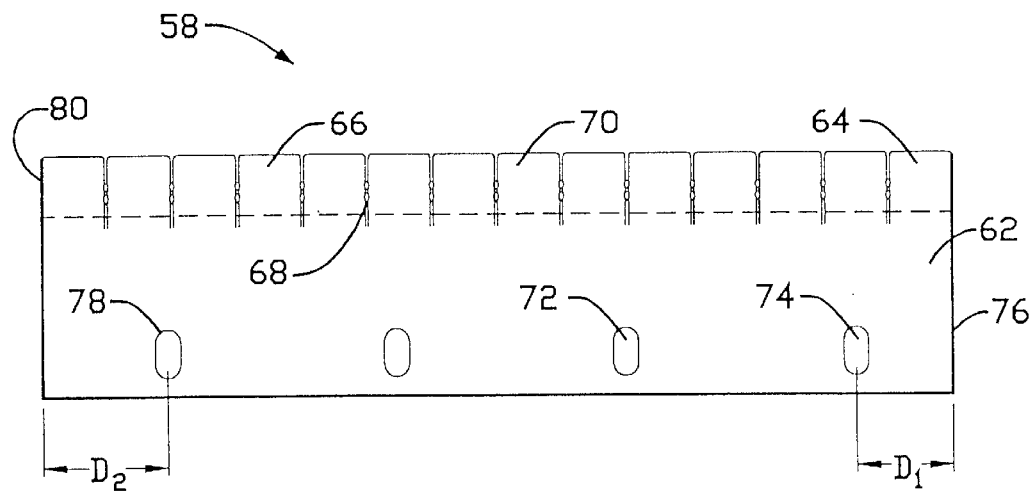
FIG. 3 is an exploded view of the bypass seal of FIG. 2.
Figure 3:
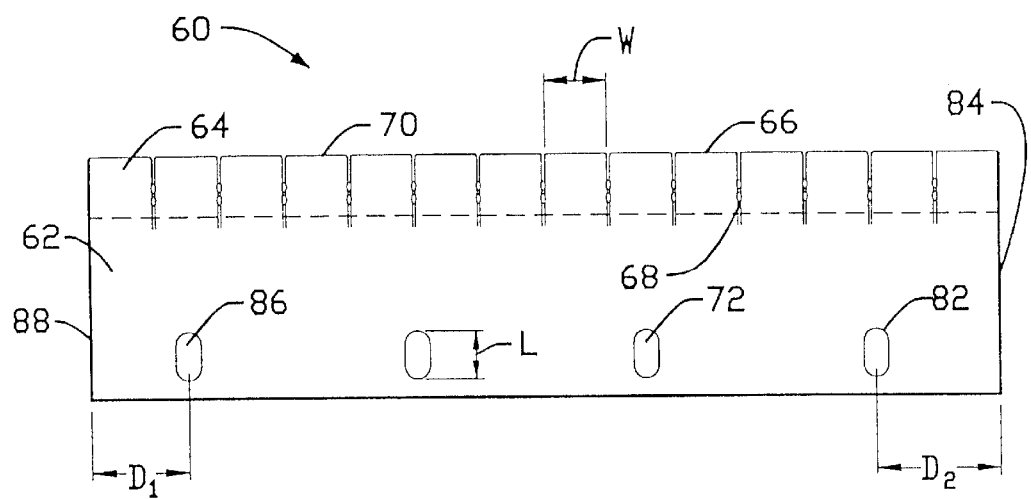
Figure 4:
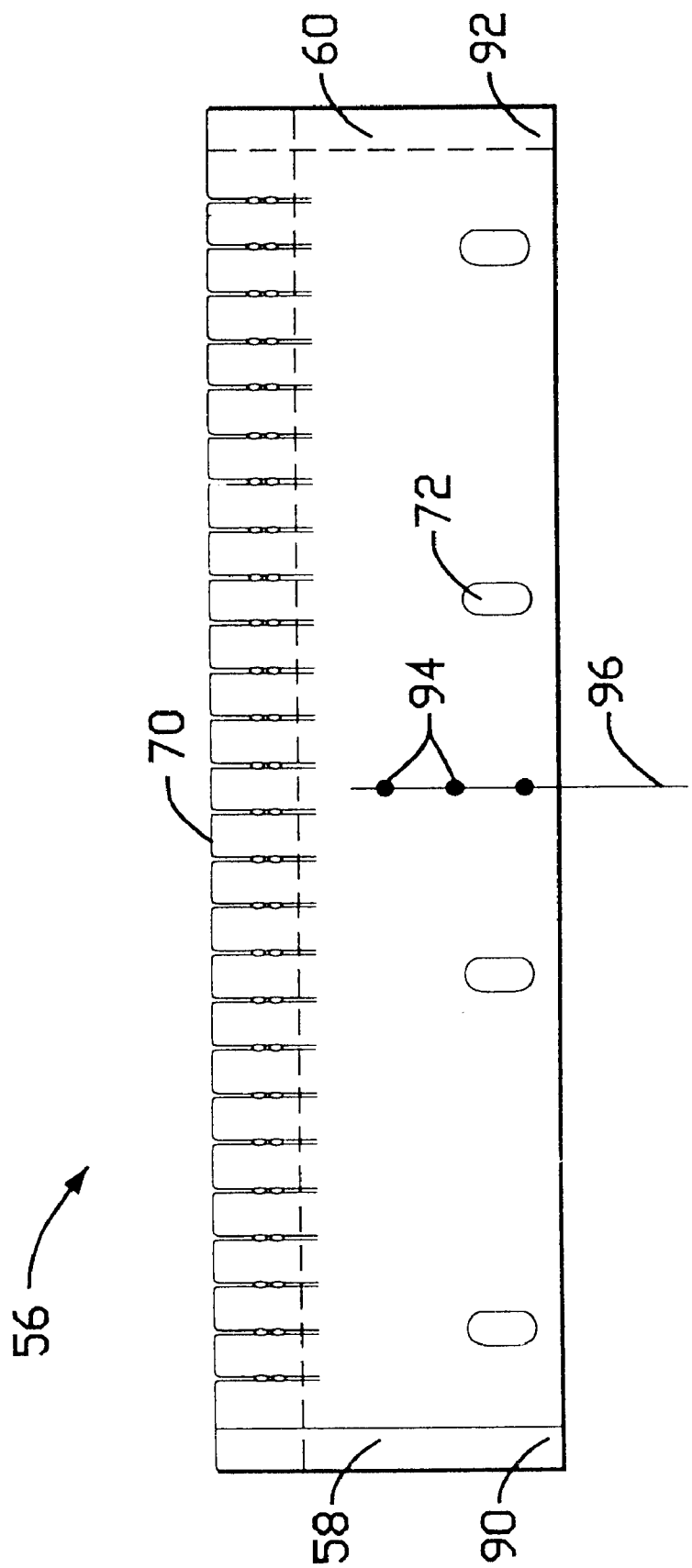
FIG. 4 is a front view of the assembled bypass seal of FIG. 2.

With reference to FIGS. 3 and 4, a primary seal leaf 58 is mounted to a secondary seal leaf 60 to form each bypass seal 56. Each seal leaf 58, 60 includes a base portion 62 and a sealing portion 64 which extends at an obtuse angle α from the base portion 62 of the leaf. The seal leaves 58, 60 are manufactured from conventional material, such that the assembled bypass seal 56 is a flexible member. The sealing portion 64 of each seal leaf 58, 60 is divided into a plurality of tabs 66 by slots 68 which extend from the sealing edge 70, to provide additional flexibility to the bypass seal 56. The slots 68 are longitudinally, equidistantly spaced, providing tabs 66 that have substantially the same width W. When the primary and secondary seal leaves 58, 60 are assembled to form the bypass seal 56, the slots 68 in each leaf 58, 60 is positioned adjacent to a tab 66 of the other leaf 60, 58, such that the tabs 66 of one leaf 58, 60 block leakage through the slots 68 of the other leaf 60, 58.

Each seal leaf 58, 60 has a plurality of equidistantly longitudinally spaced mounting slots 72, preferably four such slots 72, which are patterned non-symmetrically on the leaf 58, 60. That is, the first slot 74 in the primary seal leaf 58 is positioned at a distance $D_1$ from the right side edge 76 of the seal leaf 58, the last slot 78 in the primary seal leaf 58 is positioned at a distance $D_2$ from the left side edge 80 of the seal leaf 58, the first slot 82 in the secondary seal leaf 60 is positioned at a distance $D_2$ from the right side edge 84 of the seal leaf 60, and the last slot 86 is positioned at a distance $D_1$ from the left side edge 88 of the seal leaf 60, where $D_2 > D_1$. Consequently, when the mounting slots 72 of the primary seal leaf 58 are aligned with the mounting slots 72 of the secondary seal leaf 60, the left end segment 90 of the primary seal leaf 58 is not overlapped by the secondary seal leaf 60 and the opposite, right end segment 92 of the secondary seal leaf 60 is not overlapped by the primary seal leaf 58. When the bypass seals 56 are installed in the air preheater 10, the bypass seals 56 are positioned such that the left end segment 90 of the primary seal leaf 58 of each bypass seal 56 overlaps with the right end segment 92 of the secondary seal leaf 60 of an adjacent bypass seal 56, thereby preventing leakage between adjacent bypass seals 56. It should be appreciated that the subject invention also includes a bypass seal 56 having $D_2 < D_1$, so long as the mounting slots 72 of the seal leaves 58, 60 all of the bypass seals 56 to be installed in a single air preheater 10 have the same relationship.

In a preferred embodiment, multiple spot welds 94 located on the longitudinal centerline 96 of the bypass seal 56 mount the primary seal leaf 58 to the secondary seal leaf 60. It should be appreciated that other conventional means for mounting the two seal leaves 58, 60 together, for example a single spot weld, a seam weld, rivets, etc., may also be used. It should also be appreciated that the two seal leaves 58, 60 may be mounted together at a longitudinal position other than the centerline 96. When the bypass seal 56 is installed, it is bent to conform to the curvature of the housing 24 and rotor 26. Such bending results in a small amount of relative movement between the two seal leaves 58, 60 of the bypass seal 56. If the seal leaves 58, 60 are mounted together at two or more longitudinally spaced positions, the spot welds 94 (or other means for mounting the two seal leaves together) will constrain the relative movement between the two seal leaves 58, 60. Such constraint can result in deformation of the bypass seal 56 which could negatively impact its performance. If the two seal leaves 58, 60 are mounted together at only one longitudinal position, relative motion on either side of the weld position is not constrained. Small variations in the longitudinal positions of the individual spot welds 94 in a bypass seal 56 are generally acceptable, so long as such variation does not result in substantial deformation of the bypass seal 56 during installation.

The assembled bypass seal 56 is mounted to the bypass seal bracket 52, 54 in the field by a plurality of nuts 98 and bolts 100, where the threaded shaft of each bolt 100 is inserted through an opening 102 in the bypass seal bracket 52, 54 and a mounting slot 72 of the bypass seal 56 to be engaged within the threaded opening of the nut 98. The lateral length L of the mounting slot 72 allows for proper positioning of the bypass seal 56. The lateral length L of the mounting slot 72 and the obtuse angle α of the sealing portion 64 of the bypass seal 56 also allow the sealing edge 70 of the bypass seal 56 to be biased against the sealing surface 104 of the "T-bar" 40, 42. This provides a better seal and ensures that the sealing edge 70 maintains intimate contact with sealing surface 104 as the material of the sealing edge 70 is worn during use.

When the air preheater 10 is assembled, the bypass seals 56 form circumferential bypass seal rings 106, 108 positioned between the bottom and top ends 50, 48 of the rotor 26 and the bottom and top flanges 28, 34, respectively, and between the rotor 26 and the housing 24, to prevent the bypass of air and gas around the rotor in the gap 110 between the rotor 26 and the housing 24. When installed, the bypass seals 56 are flexible, circumferential members which are biased against the sealing surfaces 104 to form a gas and air tight seal.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A rotary regenerative air preheater having a cold end and an oppositely disposed hot end and comprising:

a substantially circular housing having a radially inner surface;

a heat exchange rotor rotatably mounted within the housing having axially spaced first and second end portions and a radially outer surface, the first and second end portions of the rotor each having a circumferential sealing surface, the radially outer surface of the rotor and the radially inner surface of the housing defining a gap; and first and second circumferential bypass seal rings disposed within the gap and sealingly engaging the sealing surface of the first and second end portions of the rotor, respectively, each of the bypass seal rings comprising a plurality of bypass seals, each of the bypass seals including longitudinally extending primary and secondary seal leaves, each of the seal leaves having oppositely disposed first and second ends and first and second end portions, the primary seal leaf of each bypass seal being mounted to the corresponding secondary seal leaf at only a single longitudinal position intermediate the first and second ends of the primary and secondary seal leaves, the first end portion of the primary seal leaf extending longitudinally beyond the first end of the secondary seal leaf and the second end portion of the secondary seal leaf extending longitudinally beyond the second end of the primary seal leaf, wherein the first end portion of the primary seal leaf of each bypass seal in each of the seal rings overlaps the second end portion of the secondary seal leaf of an adjacent bypass seal in the seal ring.

2. The air preheater of claim 1 wherein the housing further has first and second circumferential brackets extending radially inward from the inner surface of the housing, the first and second bypass rings being mounted to the first and second brackets, respectively.

3. The air preheater of claim 2, wherein each of the brackets defines a plurality of openings, the primary and secondary seal leaves of each bypass seal define a plurality of longitudinally spaced mounting slots, and the housing further has a plurality of fasteners received in the openings of the brackets and the mounting slots of the bypass seals whereby the bypass seals are mounted to the brackets.

4. The air preheater of claim 3 wherein a first of the mounting slots of the primary seal leaf is positioned at a distance $D_1$ from the first end of the primary seal leaf and a first of the mounting slots of the secondary seal leaf is positioned at a distance $D_2$ from the first end of the secondary seal leaf, where $D_2 > D_1$.

5. The air preheater of claim 4 wherein the mounting slots of each seal leaf are equidistantly spaced.

6. The air preheater of claim 3 wherein each of the fasteners includes a bolt and a nut.

7. The air preheater of claim 1 wherein the primary and secondary seal leaves are mounted together by at least one spot weld positioned at the longitudinal position intermediate the first and second ends of the seal leaves.

8. The air preheater of claim 1 wherein each of the seal leaves includes a base portion and a sealing portion extending at an obtuse angle α from the base portion to a sealing edge.

9. The air preheater of claim 8 wherein the sealing portion of each seal leaf defines a plurality of equidistantly spaced slots extending laterally from the sealing edge.

10. The air preheater of claim 9 wherein the slots in the sealing portion of each seal leaf define a plurality of tabs, a tab of each seal leaf in a bypass seal being positioned adjacent to a slot in the other seal leaf to prevent bypass leakage through the slots.

11. A rotary regenerative air preheater comprising:
a housing having an inner surface;
a heat exchange rotor rotatably mounted within the housing having a radially outer surface and axially spaced hot and cold end portions each having a circumferential sealing surface, the outer surface of the rotor and the inner surface of the housing defining a gap; and
a plurality of bypass seals mounted to the housing and sealingly engaging the sealing surfaces of the hot and cold end portions of the rotor, each of the bypass seals having oppositely disposed first and second ends and comprising longitudinally extending primary and secondary seal leaves mounted together at only a single longitudinal position intermediate the first and second ends.

12. The air preheater of claim 11 wherein each of the seal leaves has oppositely disposed first and second ends and first and second end portions, the first end portion of the primary seal leaf extending longitudinally beyond the first end of the secondary seal leaf and the second end portion of the secondary seal leaf extending longitudinally beyond the second end of the primary seal leaf, wherein the first end portion of the primary seal leaf of each bypass seal engaging the sealing surface of the hot end portion of the rotor overlaps the second end portion of the secondary seal leaf of an adjacent bypass seal and the first end portion of the primary seal leaf of each bypass seal engaging the sealing surface of the cold end portion of the rotor overlaps the second end portion of the secondary seal leaf of an adjacent bypass seal.

13. The air preheater of claim 12 wherein each of the seal leaves includes a base portion and a sealing portion extending from the base portion to a sealing edge, the sealing portion having a plurality of tabs separated by equidistantly spaced slots extending laterally from the sealing edge, one of the tabs of each seal leaf overlapping each of the slots of the other seal leaf.

14. The air preheater of claim 13 wherein each of the bypass seals defines a plurality of equidistantly, longitudinally spaced mounting slots extending through the primary and secondary seal leaves, a first of the mounting slots being positioned at a distance $D_1$ from the first end of the bypass seal and a last of the mounting slots being positioned at the distance $D_1$ from the second end of the bypass seal.

15. The air preheater of claim 14 wherein the base portion of each seal leaf defines the mounting slots, the first mounting slot of the primary seal leaf being positioned at the distance $D_1$ from the first end of the primary seal leaf, the last mounting slot of the primary seal leaf being positioned at a distance $D_2$ from the second end of the primary seal leaf, the first mounting slot of the secondary seal leaf being positioned at a distance $D_2$ from the first end of the secondary seal leaf, and the last mounting slot of the secondary seal leaf being positioned at the distance $D_1$ from the second end of the secondary seal leaf, where $D_2 > D_1$.

16. A bypass seal for a rotary regenerative air preheater having oppositely disposed first and second ends and comprising longitudinally extending primary and secondary seal leaves mounted together at only a single longitudinal position intermediate the first and second ends, each of the seal leaves having oppositely disposed first and second ends and first and second end portions, the first end portion of the primary seal leaf extending longitudinally beyond the first end of the secondary seal leaf and the second end portion of the secondary seal leaf extending longitudinally beyond the second end of the primary seal leaf, wherein the first end of the primary seal leaf defines the first end of the bypass seal and the second end of the secondary seal leaf defines the second end of the bypass seal.

17. The bypass seal of claim 16 wherein each of the seal leaves includes a base portion and a sealing portion extending from the base portion to a sealing edge, the sealing portion having a plurality of tabs separated by equidistantly spaced slots extending laterally from the sealing edge, one of the tabs of each seal leaf overlapping each of the slots of the other seal leaf.

18. The bypass seal of claim 16 wherein the base portions of each of the seal leaves define a plurality of complimentary equidistantly, longitudinally spaced mounting slots, a first of the mounting slots being positioned at a distance $D_1$ from the first end of the bypass seal and a last of the mounting slots being positioned at the distance $D_1$ from the second end of the bypass seal.

19. The bypass seal of claim 18 wherein the first mounting slot of the primary seal leaf is positioned at the distance $D_1$ from the first end of the primary seal leaf, the last mounting slot of the primary seal leaf is positioned at a distance $D_2$ from the second end of the primary seal leaf, the first mounting slot of the secondary seal leaf is positioned at a distance $D_2$ from the first end of the secondary seal leaf, and the last mounting slot of the secondary seal leaf is positioned at the distance $D_1$ from the second end of the secondary seal leaf, where $D_2 > D_1$.

* * * * *